W. L. BEAR.
ANIMAL CHECK.
APPLICATION FILED DEC. 27, 1910.
990,625.
Patented Apr. 25, 1911.
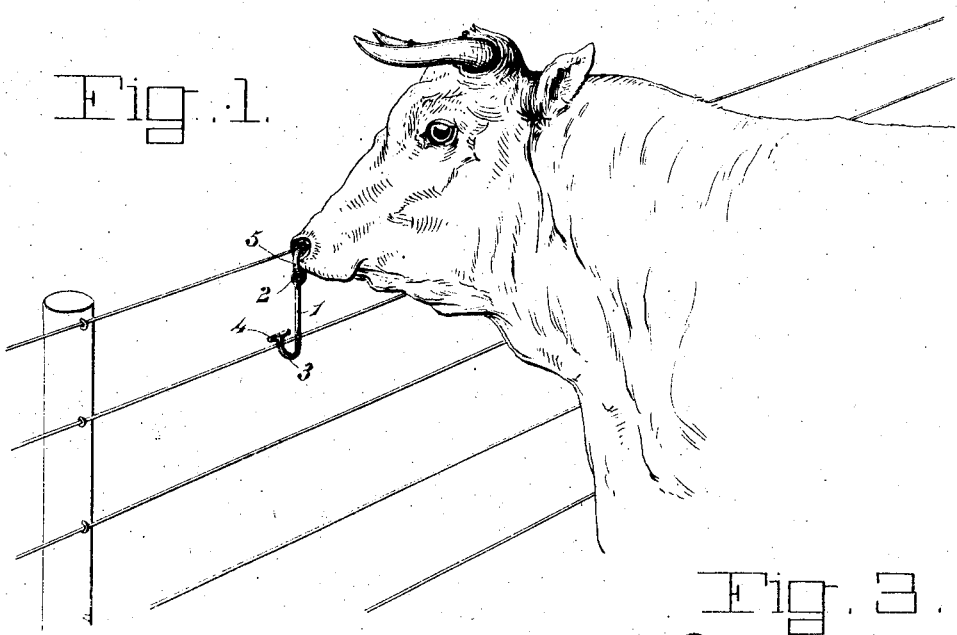
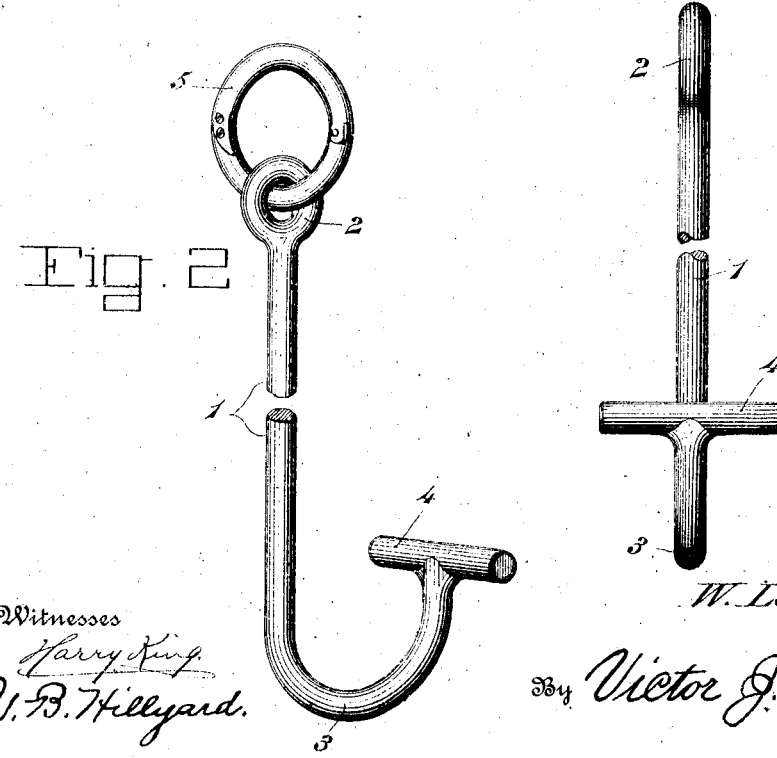
Witnesses
Harry King
U. B. Hillyard.
Inventor
W. Loren Bear.
By Victor J. Evans
Attorney

UNITED STATES PATENT OFFICE.

WILLIAM LOREN BEAR, OF CEDAR RAPIDS, IOWA.

ANIMAL-CHECK.

990,625.

Specification of Letters Patent. Patented Apr. 25, 1911.

Application filed December 27, 1910. Serial No. 599,283.

*To all whom it may concern:*

Be it known that I, WILLIAM LOREN BEAR, a citizen of the United States, residing at Cedar Rapids, in the county of Linn and State of Iowa, have invented new and useful Improvements in Animal-Checks, of which the following is a specification.

The invention provides simple and effective means of novel construction for preventing stock from leaving an inclosure either by passing between fence wires or jumping the same.

The invention consists of a hook of peculiar form adapted to be secured to the cartilage or septum of an animal's nose, said hook being adapted to engage the inclosing elements of a stockade or fence while at the same time not interfering with the animal's grazing or feeding, the hook embodying a guard to prevent its catching the slats or strips of a rack when the animal is feeding therefrom.

The invention consists of the novel features, details of construction and combination of parts, which hereinafter will be more particularly set forth, illustrated in the accompanying drawing, and pointed out in the appended claims.

Referring to the drawing, forming a part of the application, Figure 1 is a side view of a device for the purpose aforesaid embodying the invention, showing the same applied. Fig. 2 is a perspective view of the hook and nose ring. Fig. 3 is a front view of the hook.

Corresponding and like parts are referred to in the following description, and indicated in all the views of the drawing, by the same reference characters.

The check comprises a rod or shank 1, an eye 2 at one end of the rod, a hook 3 at the opposite end of the rod and a cross bar 4 at the extremity of the bill of the hook forming a guard, said cross bar extending a like distance upon opposite sides of the hook. A nose ring 5 serves as attaching means for securing the check to the septum of cartilage of the animal's nose, said ring being separable and adapted to have the parts made secure after being fitted in the septum or bridge of the nose. Prior to placing the ring 5 in position in the nose the eye of the check is fitted thereon. The nose ring when in position hangs in front of the nose transversely thereof, thereby holding the check with the hook 3 extending forwardly in position to positively engage a wire or element of the fence or inclosure whether the animal attempts to jump over the fence or to pass between the wires or elements thereof. The check is adapted to swing freely upon the nose ring toward and from the mouth, hence when grazing the hook is thrown forward to trail upon the ground and thereby not interfere with pasture feeding. When the head of the animal is held in position so that the hook is clear of the ground the check occupies a pendent position with the hook 3 extending forwardly so as to make certain the engagement thereof with the fence wire should the animal attempt to leave the inclosure by leaping over the fence or passing between the wires thereof. The cross bar 4 constitutes a guard, which prevents the hook passing between the slats or strips of a rack when the animal is feeding therefrom.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. An animal check consisting of a rod adapted to be connected to the nose of an animal and having a hook at one end and having a cross bar at the extremity of the bill of the hook to form a guard.

2. An animal check for preventing stock leaving an inclosure, said check consisting of a rod having an eye at one end, a hook at the opposite end, and a cross bar at the extremity of the bill of the hook to form a guard.

3. An animal check comprising a nose ring, a rod having an eye at one end to receive the nose ring and provided at its opposite end with a hook, the latter terminating in a cross bar forming a guard.

In testimony whereof I affix my signature in presence of two witnesses.

WM. LOREN BEAR.

Witnesses:
RUTH BEAR.
MARION H. MONROE.